United States Patent
Brunetto

(10) Patent No.: US 9,443,233 B1
(45) Date of Patent: Sep. 13, 2016

(54) PAYMENT USING A FRACTAL IMAGE

(71) Applicant: Jacob Giuseppe Brunetto, El Cajon, CA (US)

(72) Inventor: Jacob Giuseppe Brunetto, El Cajon, CA (US)

(73) Assignee: Intuit Inc., Mountain View, CA (US)

( * ) Notice: Subject to any disclaimer, the term of this patent is extended or adjusted under 35 U.S.C. 154(b) by 737 days.

(21) Appl. No.: 13/654,608

(22) Filed: Oct. 18, 2012

(51) Int. Cl.
| | |
|---|---|
| *G06Q 20/00* | (2012.01) |
| *G06Q 20/10* | (2012.01) |
| *G06Q 20/04* | (2012.01) |
| *G06Q 20/38* | (2012.01) |

(52) U.S. Cl.
CPC ............ *G06Q 20/108* (2013.01); *G06Q 20/04* (2013.01); *G06Q 20/382* (2013.01)

(58) Field of Classification Search
None
See application file for complete search history.

(56) References Cited

U.S. PATENT DOCUMENTS

| | | | |
|---|---|---|---|
| 5,867,603 A * | 2/1999 | Barnsley et al. | 382/249 |
| 2004/0123134 A1* | 6/2004 | Sasich et al. | 713/200 |
| 2004/0250083 A1* | 12/2004 | Schwab | 713/182 |
| 2007/0022058 A1* | 1/2007 | Labrou et al. | 705/67 |

* cited by examiner

*Primary Examiner* — John Hayes
*Assistant Examiner* — Tim Hale
(74) *Attorney, Agent, or Firm* — Osha Liang LLP

(57) ABSTRACT

A method for approving a commercial transaction using a customer generated fractal image. The method includes receiving, from a central authority, a seed, and receiving a request for the customer generated fractal image for payment of the commercial transaction with a merchant. In response to the request, payment device information is obtained and the customer generated fractal image is generated using the seed and the payment device information. The customer generated fractal image is displayed on the mobile device where it is scanned by the merchant to obtain a scanned fractal image. The scanned fractal image is sent, by the merchant, to the central authority. The central authority approves the commercial transaction by generating an expected fractal using a copy of the payment device information and the seed, and comparing the scanned fractal image with the expected fractal.

10 Claims, 6 Drawing Sheets

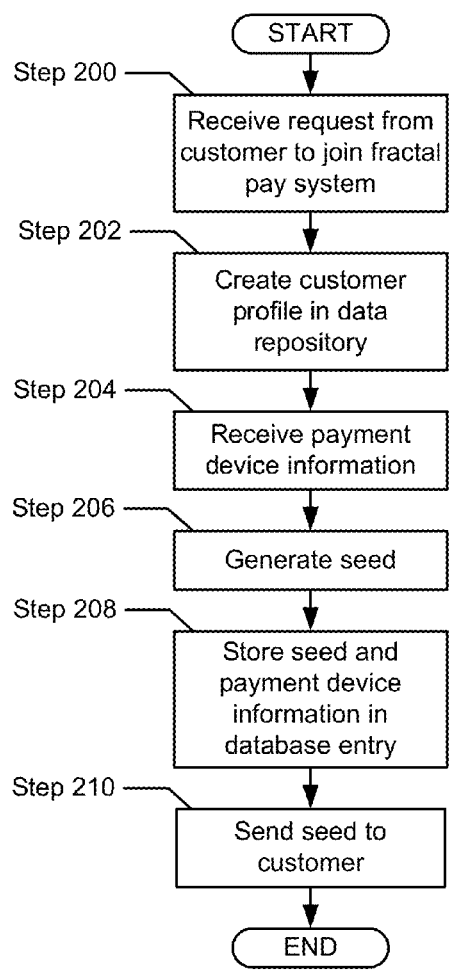
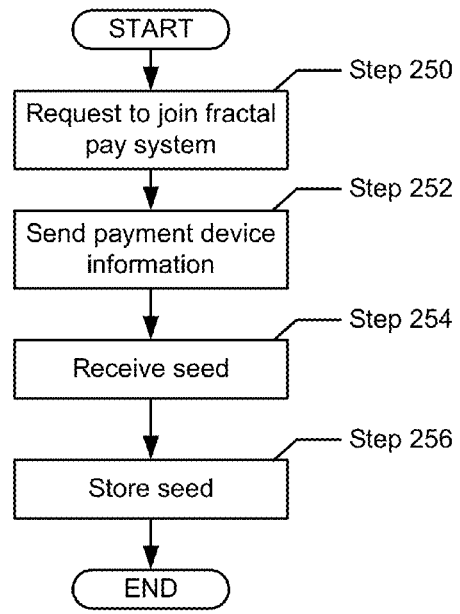
FIG. 2A
FIG. 2B

PAYMENT USING A FRACTAL IMAGE

SUMMARY

In general, in one aspect, the invention relates to a method for approving a commercial transaction using a customer generated fractal image. The method includes receiving, from a central authority, a seed, receiving a request for the customer generated fractal image for payment of the commercial transaction with a merchant, obtaining payment device information from a data repository on a mobile device, generating the customer generated fractal image using the seed and the payment device information, and displaying the customer generated fractal image on a display of the mobile device. The merchant scans the display to obtain a scanned fractal image, and sends the scanned fractal image to the central authority. The central authority approves the commercial transaction by generating an expected fractal using a copy of the payment device information and the seed, and comparing the scanned fractal image with the expected fractal.

In general, in one aspect, the invention relates to a method for facilitating a commercial transaction between a merchant and a customer. The method includes receiving payment device information. The payment device information includes a payment device number. The method further includes generating a seed, sending the seed to the customer, receiving, from the merchant, a scanned fractal image, generating an expected fractal using the payment device information and the seed, approving the commercial transaction by comparing the scanned fractal image and the expected fractal, and facilitating, in response to approval of the commercial transaction, the commercial transaction between the merchant and the customer.

In general, in one aspect, the invention relates to a system, including a computer processor and a data repository. The data repository includes a customer profile including payment device information of a customer and a seed. The system further includes a manager, executing on the computer processor and operatively connected to the data repository. The manager includes functionality to receive, from a point of sale system, a customer generated fractal image associated with the customer, generate an expected fractal using the payment device information and the seed, compare the customer generated fractal image with the expected fractal, and transfer funds to the merchant account using the payment device information when the customer generated fractal image matches the expected fractal.

In general in one aspect, the invention relates to a non-transitory computer readable medium, including computer readable program code embodied therein for causing a computer system to pay for a commercial transaction using a customer generated fractal image by receiving, from a central authority, a seed, receiving a request for a customer generated fractal image for payment of the commercial transaction with a merchant, obtaining payment device information from a data repository on a mobile device, generating the customer generated fractal image using the seed and the payment device information, and displaying the customer generated fractal image on the mobile device to obtain a displayed fractal image. The merchant verifies the payment device information with the central authority using the displayed fractal image.

Other aspects and advantages of the invention will be apparent from the following description and the appended claims.

BRIEF DESCRIPTION OF DRAWINGS

FIGS. 2A and 2B show flowcharts for initializing the system in one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Credit and debit cards are a widely used form of payment for goods and services. To use a debit or credit card, a person will typically receive the total amount due, and present the plastic debit and/or credit card to the cashier. Although the physical devices may be secured, the information contained on the credit card is susceptible to being copied and used for fraudulent activities. In its current incarnation, credit card information can be easily obtained with only a discrete camera or a fake magnetic strip scanner. What is more, the theft of payment information may not be known to the victimized party until significant charges have already been accrued in their name.

In general, embodiments of the invention relate to a method and system for facilitating a commercial transaction between a merchant and customer using a fractal image. In one or more embodiments of the invention, a commercial transaction is a sale of a good and/or service between a merchant and a customer or a refund associated therewith. In one or more embodiments of the invention, the customer displays the fractal image, on a mobile device, to the merchant, who scans the fractal and sends it to the central authority for verification. The fractal is generated on the mobile device using a seed generated by the central authority and payment device information. The central authority then verifies the authenticity of the fractal using a copy of the payment device information and the seed. Upon verification of the customer's identity, the central authority facilitates the commercial transaction.

Figure 1:
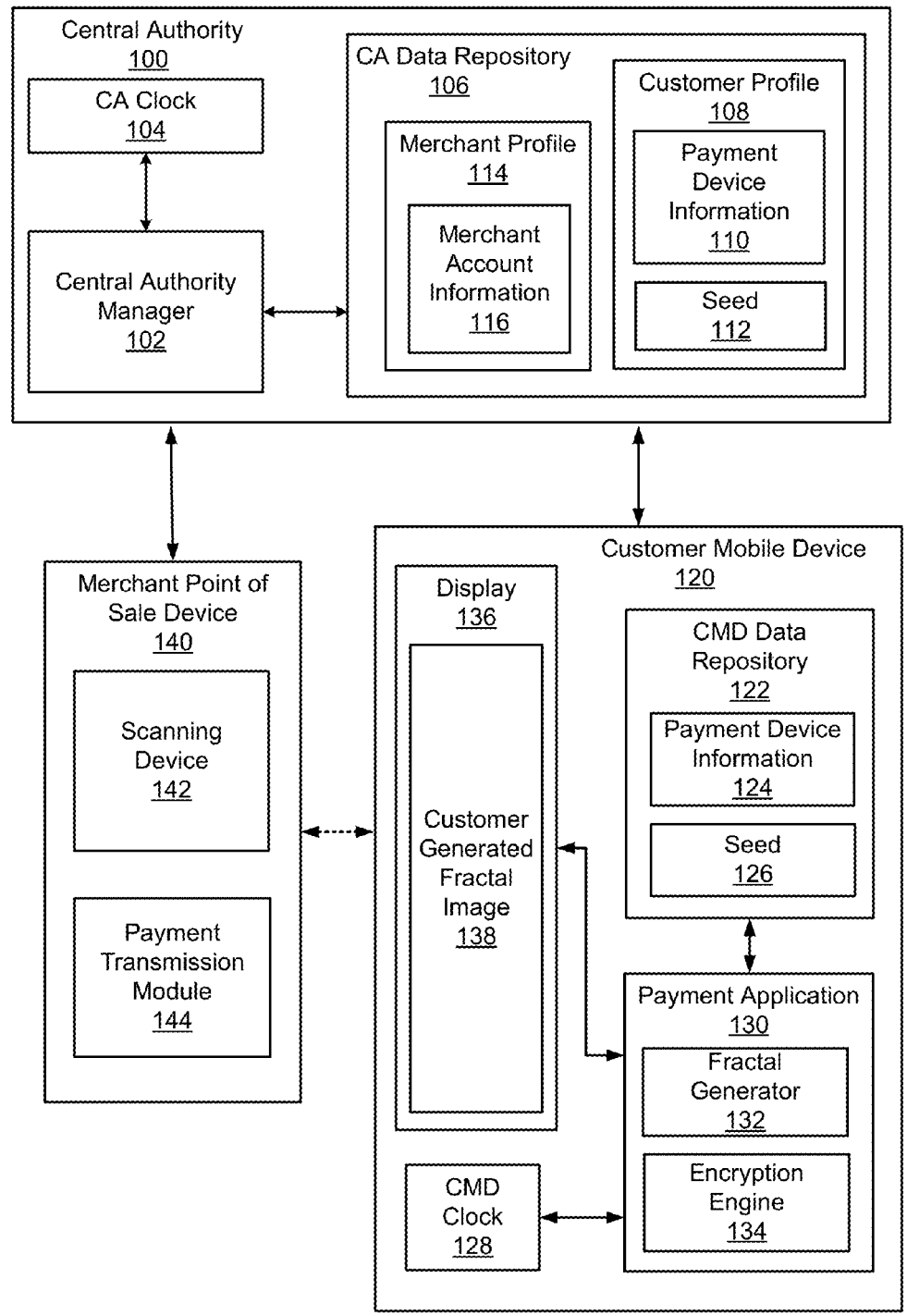
FIG. 1 shows a schematic diagram of the system in accordance with one or more embodiments of the invention.

FIG. 1 shows a system in accordance with one or more embodiments of the invention. The system includes a central authority (100), a customer mobile device (120) and a merchant point of sale device (140). In one or more embodiments of the invention, both the customer mobile device (120) and the merchant point of sale device (140) are configured to communicate with the central authority (100) over a network (not shown). The central authority (100), the customer mobile device (120), and the merchant point of sale device (140) are discussed in further detail below.

In one or more embodiments of the invention, the central authority (100) includes a central authority manager (102), a clock (i.e., Central Authority ("CA") clock (104)), and a data repository (i.e., CA data repository (106)). The central authority manager (102) corresponds to processing logic, which may include hardware and/or software, for performing the functionality of the central authority. In one or more embodiments of the invention, the central authority manager (102) includes functionality to communicate with a customer mobile device (120) and a merchant point of sale device (140), accessing the CA data repository (106), generating a seed (112), verifying the authenticity of a fractal image, and facilitating a commercial transaction on the customer's behalf. The central authority manager (102) may include a pseudo-random number generator for generating a seed (112).

In one or more embodiments of the invention, a CA clock (104) may be a physical device located directly on the central authority (100). In one or more embodiments of the invention, a CA clock (104) includes functionality to output the time to a certain level of precision. The CA clock (104) may be an abstraction of a crystal oscillator located on a computer processor, and the time is obtained by dividing processor cycles occurring at the frequency of the crystal oscillator. The CA clock (104) may be synchronized with the CMD clock (128) located on the customer mobile device (120). In one or more embodiments of the invention, both of the clocks (104, 128) are synchronized, over a network, with a clock belonging to a third party. Alternately, the central authority may use the time of the third-party clock directly.

In one or more embodiments of the invention, the CA data repository (106) is any type of storage unit and/or device (e.g., a file system, database, collection of tables, or any other storage mechanism) for storing data. Further, the CA data repository (106) may include multiple different storage units and/or devices. The multiple different storage units and/or devices may or may not be of the same type or located at the same physical site. The CA data repository (106) includes functionality to store profiles (108, 114) for the customers and merchants. The profiles (108, 114) are used to organize customer and merchant data into fields. The customer profile (108) may include fields to store the identity, address and contact information of the customer, payment device information (110) of the customer, and a seed (112) associated with customer.

In one or more embodiments of the invention, the payment device information (110) corresponds to information about a medium for transferring funds from a customer's account to a third party (e.g., the merchant). For example, the payment device may correspond to a credit card, a debit card, a checking account, etc. Thus, the payment device information may include a credit card number, expiration date and security number. Alternately or additionally, the payment device information may identify a debit or checking account, an online money transfer service (i.e. PayPal) or any other method used for electronically paying for a commercial transaction. The payment device information (110) may be encrypted when stored.

In one or more embodiments of the invention, a seed (112) is stored in the customer profile (108). In one or more embodiments of the invention, the seed (112) is a randomly-generated number assigned to the customer. In one or more embodiments of the invention, the seed is sufficiently large to be secure. With a high likelihood, two different customers have different corresponding seeds. The seed (112) may be generated a number of different ways, and correspond to a wide range of possible values without departing from the scope of the invention. In one or more embodiments of the invention, a copy of the seed (112) is stored on the customer mobile device (120). In one or more embodiments of the invention, the seed (112) may be changed at the behest of the customer, or according to a schedule. Further, although FIG. 1 shows a single seed assigned to a customer, multiple seeds may be assigned to the customer without departing from the scope of the invention.

The merchant profile (114) may include fields to store the identity, address and contact information of the merchant, and a merchant account information (116) associated with the merchant in one or more embodiments of the invention. In one or more embodiments of the invention, the merchant account information (116) is information about a financial account of a merchant for the transfer of funds in a commercial transaction. For example, the merchant account information may include a checking account number, routing number, a bank identifier, and/or any other information for identifying the merchant's financial account.

Continuing with FIG. 1, the customer mobile device (120) includes a data repository (i.e., CMD data repository (122)), a clock (i.e., CMD clock (128)), a payment application (130), and a display (136). The customer mobile device (120) may be a phone, tablet PC, eBook or any other form of mobile electronic. In one or more embodiments of the invention, customer mobile device (120) also includes the one or more computer processor(s) (not shown) such as a central processing unit (CPU), integrated circuit, or other hardware processor, associated memory (not shown) (e.g., random access memory (RAM), cache memory, flash memory, etc.), a storage device (not shown) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the computer processor (not shown) includes functionality to execute the payment application (130) using memory. In one or more embodiments of the invention, the customer mobile device (120) may include hardware components for connecting to a network to join and initialize the fractal pay system.

In one or more embodiments of the invention, the CMD data repository (122) is any type of storage unit and/or device (e.g., a file system, database, collection of tables, or any other storage mechanism) for storing data. Further, the CMD data repository (122) may include multiple different storage units and/or devices. The multiple different storage units and/or devices may or may not be of the same type or located at the same physical site. The CMD data repository (122) contains local copies of the payment device information (124) and seed (126). In one or more embodiments of the invention, the copies (i.e., the payment device information (124), seed (126)) are identical to the payment device information (110) and seed (112), respectively, stored in the customer profile (108) in the CA data repository (106). In one or more embodiments of the invention, the payment device information (124) is omitted. For example, the payment device information (124) in the CMD data repository (124) may be replaced with other customer identifying data (e.g., unique identifier for the customer, address, social security number, etc.). In such embodiments, the central authority (100) also stores a copy of the other customer identifying data.

In one or more embodiments of the invention, a CMD clock (128) is located on the customer mobile device (120). The CMD clock (128) is much the same as the CA clock (104).

In one or more embodiments of the invention, a payment application (130) executes on the customer mobile device (120). The payment application (130) corresponds to a software application on the customer mobile device (120) for facilitating payment at a merchant location. The payment application (130) includes functionality to retrieve the payment device information (124) and seed (126) from the data repository (122), obtain the time from the clock (128), and communicate with the central authority (100) over a network.

In one or more embodiments of the invention, the payment application (130) includes a fractal generator (132) and an encryption engine (134). The fractal generator (132) is a computer program configured to use a data set and a fractal generation algorithm to create a fractal. For example, the data set may be the payment device information, the seed, and time. The data set may be encrypted, such as by the encryption engine (134) (discussed below). A fractal is an equation or pattern that branches or repeats infinitely. In other words, a fractal is a curve or geometric figure, each part of which has the same statistical character as the whole. Example of a fractal would be the Sierpinski triangle and the Mandelbrot set. The fractal generator (134) is configured to then generate a two dimensional gradient field based of2f an approximation of the equation, which can be displayed on a display (136) as a customer-generated fractal image (138). In other words, the customer-generated fractal image (138) is a visual representation of the fractal.

In one or more embodiments of the invention, the payment application (130) includes an encryption engine (134). The encryption engine (134) is configured to generate an encrypted data set by applying an algorithm to the payment device information (124), seed (126) and the current time. In one or more embodiments of the invention, alternate customer data may be used instead of the payment device information (124). In one or more embodiments of the invention, the current time may be deemed a nonce. A nonce is a one-time-use number used in cryptographic algorithms to prevent replay attacks. Other types of nonce may be used as well. For example, an arbitrarily incremental value may be used instead of the current time.

In one or more embodiments of the invention, the customer mobile device (120) is configured to display the customer-generated fractal image (138) on a display (136). The display (136) may be required to have a minimum resolution or size. The display (136) may be monitor, touchscreen, or any other device for displaying data.

Continuing with FIG. 1, the merchant point of sale device (140) is a physical device for completing a commercial transaction with a customer. The merchant point of sale device (140) may include, or may itself be a part of, a cash register, a credit card scanner, or any other type of point of sale device. In one or more embodiments of the invention, the merchant point of sale device (140) includes a scanning device (142) and a payment transmission module (144).

In one or more embodiments of the invention, the scanning device (142) is configured to scan or take a picture of the customer-generated fractal image. The scanning device (142) may be a camera, laser scanner, bar code reader or some other device capable of scanning the image.

In one or more embodiments of the invention, the merchant point of sale device (140) includes a payment transmission module (144). The payment transmission module (144) includes functionality to retrieve the scanned fractal image from the scanning device (142) and transmit the scanned fractal image to the central authority (100) over a network (not shown). The payment transmission module (144) may also be configured to transmit the details of a commercial transaction to the central authority (100) or receive payment device information (110) from the central authority (100) over the network (not shown).

FIGS. 2A-5 show flowcharts in one or more embodiments of the invention. While the various steps in these flowcharts are presented and described sequentially, some or all of the steps may be executed in different orders, may be combined or omitted, and some or all of the steps may be executed in parallel without departing from the scope of the invention. Furthermore, the steps may be performed actively or passively. For example, some steps may be performed using polling or be interrupt driven in accordance with one or more embodiments of the invention. By way of an example, determination steps may not require a computer processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIGS. 2A and 2B show flowcharts for initializing the system in accordance with one or more embodiments of the invention. In Step 200, the central authority receives a request from the customer to join the fractal pay system. The request is sent from a customer mobile device to the central authority over the network. The request may come from a software application running on a mobile device belonging to the customer. Alternately the customer may send the request by accessing a website using the mobile device or another device. In one or more embodiments of the invention, a software application for using the fractal pay system may be made available to the customer after they have joined the fractal pay system.

In Step 202, the central authority creates a profile for the customer in the data repository in one or more embodiments of the invention. In one or more embodiments of the invention, the customer profile is created for a customer who has just joined the fractal pay system. The central authority may then prompt the customer to provide the data to fill out the profile. Examples of the information may include name, contact information, address, the technical details of the mobile device the customer is using for the fractal pay system or other information relevant for financial transactions or using the fractal pay system. Additional information, such as a security question or identity verification system may also be required.

In Step 204, the central authority receives payment device in one or more embodiments of the invention. The payment device information may be received directly or indirectly from the customer. In one or more embodiments of the invention, the central authority receives payment device information for multiple payment devices. Although not shown in FIG. 2A, the central authority may also receive customer instructions for use, such as specific payment device information to use for specific retailers, or purchase categories, or spending limits. For example, a user may enter a personal credit card number and a corporate credit card number, with instructions to use the personal credit card for groceries and the corporate credit card for office supplies. In another example, one payment device may have benefits associated with one category of purchases, for example gasoline, and another might have benefits associated with a different category, such as flying, and the customer may create a rule specifying that the different cards be used for their respective categories.

Rather than performing Steps 200 and 202, the central authority or a third party (e.g., financial institution), may have a preexisting relationship with the customer. In such a scenario, the central authority may gather the information from another data repository and automatically setup a profile for the customer in the data repository. For example, a financial institution may present their customers option to pay using a fractal image. In such a scenario, the financial institution may control the central authority or may provide the central authority with the data (e.g., customer identifying information, payment device information) for populating the customer profile.

In Step 206, the central authority generates a seed for the customer. In one or more embodiments of the invention, the seed is generated by a pseudo-random number generator located in the central authority manager. Alternatively, the customer or the central authority may arbitrarily generate a seed. For example, an employee associated with the central authority or the customer may create an alphabetic or alphanumeric string to use as the seed. Rather than the central authority generating the seed, the seed may be generated by the customer (e.g., the customer's mobile device) and provided to the central authority.

In Step 208, the central authority stores the seed and payment device information in their respective fields in the customer profile.

In Step 210, the central authority sends the seed to the customer in one or more embodiments of the invention. In one or more embodiments of the invention, the seed is sent to the customer mobile device over the network. Alternatively, the seed may be given to the customer on a memory card or a smart card. In scenarios in which the customer generates the seed or selects a password, the customer may provide the central authority with the seed.

Although the above discusses transmission of data over a network, data may be transmitted in person, over the phone, or directly, without departing from the scope of the invention.

FIG. 2B shows a flowchart for setting up the fractal pay system on the customer mobile device, in accordance with one or more embodiments of the invention. In Step 250, the customer sends a request to join the fractal pay system using the mobile device. The request to join the network may be sent by accessing a webpage with the device, and manually setting up an account. Alternately, a software application associated with the fractal pay system may be downloaded, installed, and then used to request to join the fractal pay system. As another alternative example, the customer may request to use the fractal image while establishing a payment device account at a financial institution.

In Step 252, payment device information is sent to the mobile device in one or more embodiments of the invention. For example, the customer mobile device may prompt the customer to enter payment device information. The payment device information may include a credit card number, expiration date and security number. The customer mobile device may prompt the customer to enter information for additional payment devices. The customer may also enter instructions or payment limits associated with the particular payment devices. The customer mobile device then sends the payment device information to the central authority.

In Step 254, the customer mobile device receives a seed in one or more embodiments of the invention. In one or more embodiments of the invention, the seed is received from the central authority. A seed is deemed to be received from the central authority if both the central authority and the customer are provided with a copy of the seed. For example, the seed may be received via a network from the central authority. As another example, the seed may be received from a third party, such as a financial institution, which also provides a copy of the seed to the central authority. The seed is a random number generated by the central authority manager in the central authority. In one or more embodiments of the invention, the customer may send a request for a new seed to the central authority at any time. Alternatively or additionally, the central authority may also generate and send a new seed if it is determined that a new one is needed, or on a predetermined schedule. In Step 256, the customer mobile device stores the seed in a data repository.

Although FIG. 2B presents the customer joining the fractal pay system using the customer mobile device, the customer may join the fractal pay system using another device, or in person, without departing from the scope of the invention. In such embodiments, the central authority may provide the seed to the customer mobile device after or as a part of establishing the customer profile at the central authority.

Figure 3:
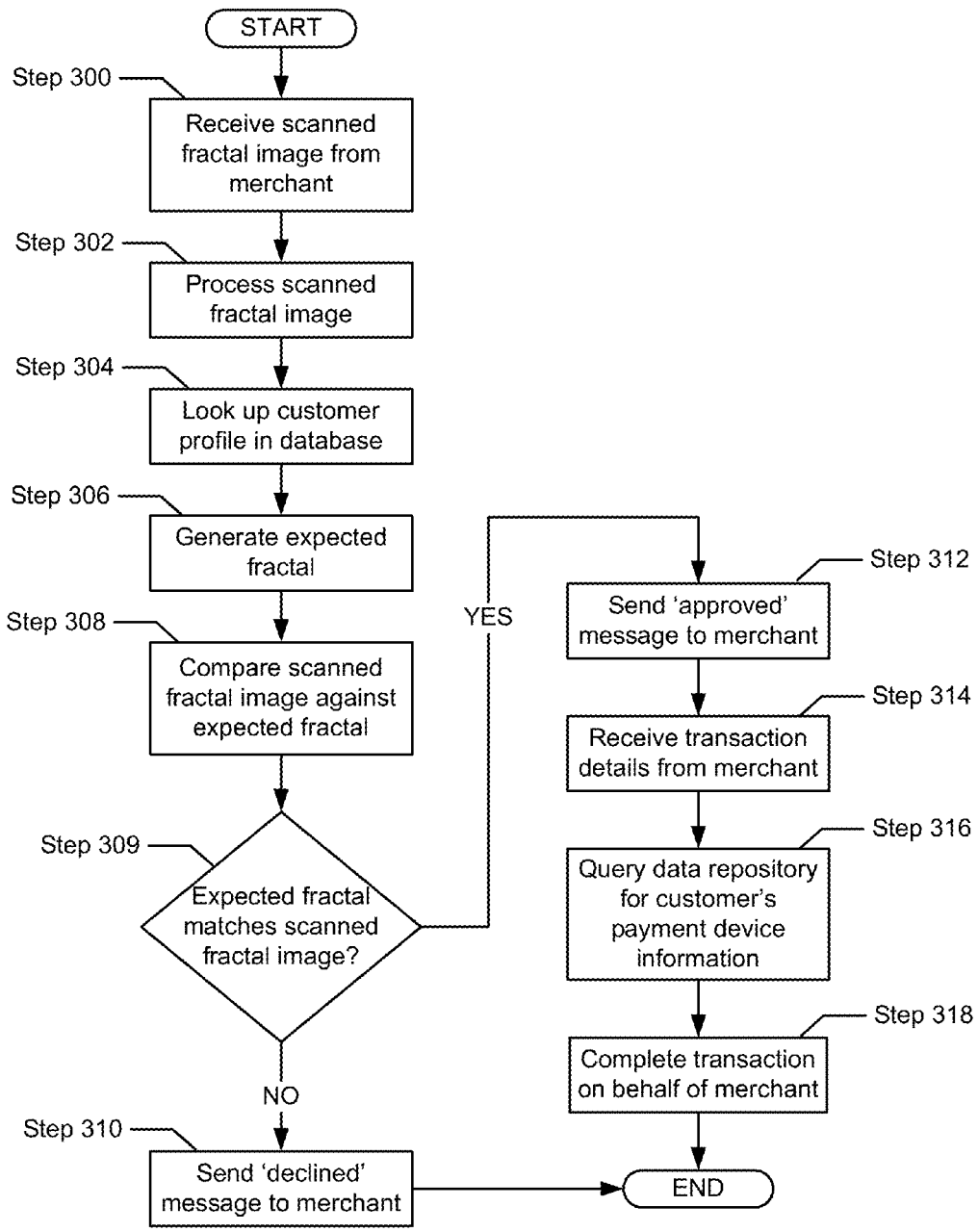
FIGS. 3-5 show flowcharts detailing the operation of the system in one or more embodiments of the invention.

FIG. 3 shows a flowchart for the operation of the fractal pay system from the perspective of the central authority, in accordance with one or more embodiments of the invention. In Step 300, the central authority receives a scanned fractal image from the merchant. In one or more embodiments of the invention, the central authority records the time that the central authority received the scanned fractal image. The time may be recorded in terms of a time frame, whereby each time frame is a range of times for which a fractal image is valid. For example, if the scanned fractal image is received at 11:23:17 AM, then the central authority may record that the fractal image is received at 11:23:00 AM, between 11:23:00 AM and 11:24:00 AM, between 11:20:00 AM and 11:25:00 AM. Other techniques for recording the time may be used without departing from the scope of the invention. For example, the central authority may use Unix time.

Rather than the central authority storing the time defined by the receipt of the transmission, the central authority may store a time defined by the merchant, such as the time of the transmission, the time that the merchant scanned the fractal image, etc.

In Step 302, the central authority processes the scanned fractal image in one or more embodiments of the invention. Initial processing may include extracting the exact fractal from the image, determining an orientation of the image using markers stored within the image. Initial processing may also be used to determine the identity of the customer. The identifying information of the customer may be included in a separate layer or portion of the image from the fractal, so that the central authority can easily locate the customer profile in order to verify the fractal image.

For example, the customer identity information may be stored on a corner of the scanned fractal image, as a number or a small two dimensional bar code (quick response (QR)

code). In one or more embodiments of the invention, identifying information of the customer may be sent separately, either as entered by the merchant, or as an entirely separate image displayed on the customer mobile device and scanned by the merchant point of sale device alongside, before or after the scanned fractal image.

If the scanned fractal image is a picture of a customer mobile device displaying a customer generated fractal image, the central authority may need to process the image to isolate the customer generated fractal image. In one or more embodiments of the invention, the fractal image is processed further to determine that the fractal image was generated by a known customer, and that it was generated within a certain time frame before the central authority received the fractal.

In Step 304, the central authority looks up the customer profile associated with the identifying information in the scanned fractal image. Specifically, the central authority may query the data repository with the extracted customer identifier to obtain payment device information and the seed.

In Step 306, the central authority generates an expected fractal. In one or more embodiments of the invention, the expected fractal is generated using the payment device information and seed from the customer profile, and the recorded time that the scanned fractal image was received. In one or more embodiments of the invention, the expected fractal may be generated in a manner similar to the payment application generating the fractal image as discussed below and in FIG. 4. In one or more embodiments of the invention, the generation of the expected fractal may or may not complete to generating an image from the expected fractal. If there is information for multiple payment devices, the central authority may generate a separate expected fractal for each. In such a scenario, in the comparison step presented below, each generated fractal image is compared against the scanned fractal image. Alternately, a message specifying which payment device information to use may be encoded in the scanned fractal image, but separate from the fractal itself. In one or more embodiments of the invention, the central authority only generates an approximate data set or equation for the expected fractal which can be compared against the scanned fractal image.

In Step 308, the central authority compares the expected fractal against the scanned fractal image. The comparison may include matching a predetermined number of points between the scanned fractal image and the expected fractal. In one or more embodiments of the invention, the scanned fractal image can be analyzed to extract its component parts, such as particular color or other values of particular data points in the expected fractal image. The component parts may then be compared against the raw value to determine the authenticity of the scanned fractal image. Alternatively, an expected fractal image may be generated from the expected fractal and compared directly with the scanned fractal image.

In Step 309, a determination is made whether fractal images match in one or more embodiments of the invention. Specifically, a determination is made whether the expected fractal matched the scanned fractal image during the comparison in Step 308. In one or more embodiments of the invention, the expected fractal matches the scanned fractal image when the scanned fractal image is substantially identical to an expected fractal image generated from the expected fractal or when a substantially large portion of data points on the scanned fractal image match the expected fractal. In one or more embodiments of the invention, substantially identical and substantially large portion each mean at least ninety percent is the same.

In Step 310, if the scanned fractal image fails to match the expected fractal, or is invalid in some other way, the central authority sends a 'decline' message to the merchant point of sale device. The decline message may be send with only the indication that the scanned fractal image is declined. Alternatively, the decline message may also include a reason for the scanned fractal image to be declined. The scanned fractal image may be invalid for a number of reasons. These reasons may include that the time frame in which the scanned fractal image was valid has expired, the scanned fractal image itself is unclear and cannot be processed, the customer who sent the image is unknown, or a variety of other reasons. Depending on the circumstances of the scanned fractal image being declined, the central authority may request, for example, that the scanned fractal image be resent, that the customer mobile device display be rescanned, that the customer generated fractal image be regenerated, or that alternate payment device information be used. If the central authority suspects the seed has been compromised (e.g., and is being used by a nefarious individual), the central authority may alert the customer (e.g., through a message to the customer), or generate a new seed and send it to the customer mobile device.

If in Step 309, a determination is made that the fractal images match, in Step 312, the central authority sends an 'approved' message to the merchant point of sale device. Specifically, the central authority approves of the fractal image.

In Step 314, the central authority receives transaction details from the merchant point of sale device in one or more embodiments of the invention. The transaction details may include, for example, information identifying the merchant, the items or services purchased, the amount of the purchase or transaction, the time and location of the transaction, and other information relevant to facilitating payment appropriately. The central authority may receive the transaction details with the scanned fractal image in Step 300. Alternatively or additionally, the central authority may receive the transaction details after sending the approved message and in response to the merchant's receipt of the approved message. In one or more embodiments of the invention, the transaction details may be received over a network. The transaction details may or not be encrypted when received. If encrypted, the central authority may decrypt the transaction details.

In Step 316, the central authority recovers the customer's payment device information from the data repository. If the scanned fractal image included instructions specifying a payment device to use, or if the purchases fall into a category with a specified payment device, the appropriate payment device information is retrieved. For example, consider the scenario in which the customer specifies a particular payment device for clothing purchases, another payment device for plane tickets, and a final payment device for the remaining goods. In such a scenario, the transaction details may be parsed to identify the merchant identifier. Based on a merchant identifier and a data repository that relates categories to merchant identifiers, a determination is made as to whether the category of merchant is an apparel store, an airline, or something else. Depending on the category of merchant, the payment device is selected to pay the transaction according to the customer profile. By way of another example, the scanned fractal image may have an embedded number or other identifier assigned to a particular payment device of the multiple payment devices in the customer profile. In such a scenario, the central authority may extract the identifier from the scanned fractal image, and obtain the payment device information from the customer profile matching the identifier.

In Step 318, the central authority completes the transaction on behalf of the merchant. In one or more embodiments of the invention, the central authority completes the commercial transaction by transferring money from a financial account corresponding to the payment device into a merchant account corresponding to the merchant. Transferring money may include performing all the steps of the transfer, initiating the transfer, or requesting a financial institution to complete the transfer. In one or more embodiments of the invention, rather than receiving transaction details from the merchant, the central authority sends the customer's payment device information to the merchant. In such a scenario, the merchant completes the commercial transaction directly.

Figure 4:
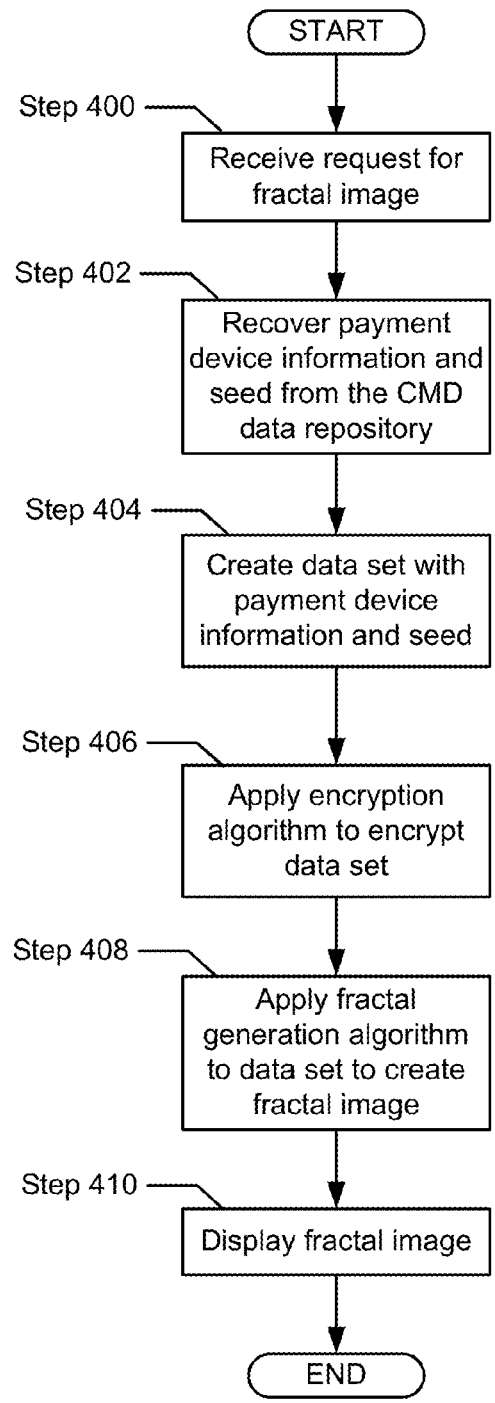

FIG. 4 shows a flowchart for operation of the fractal pay system from the perspective of the customer mobile device in one or more embodiments of the invention.

In Step 400, a payment application running on the customer mobile device receives a request to generate a fractal image. For example, the customer may open or execute the payment application. In response to opening the payment application, the payment application may automatically generate the fractal image. Alternatively or additionally, the customer may select a button or other user interface component in the payment application to request generation of the fractal image. In one or more embodiments of the invention, as part of requesting to generate the fractal image, the customer may be prompted to select a certain payment device's information to use in the generation of the fractal image.

In one or more embodiments of the invention, when an expired or unwanted customer generated fractal image is being displayed, the customer instructs the already running application to generate a new fractal image. For example, if the central authority sends a decline message that the scanned fractal image has expired, then the customer may request generation of a new fractal image in the payment application. In one or more embodiments of the invention, requesting generation of the new fractal image may include selecting a button or other user interface component to request a new fractal image.

In Step 402, the payment application recovers, from the CMD data repository, the appropriate payment device information and a seed. The payment device information recovered in Step 402 may include only a payment device number, the security number and expiration date, and/or additional information corresponding to the payment device. In one or more embodiments of the invention, a number representing the payment device that is not sensitive information is used. This number must be known to both the payment application and the central authority. In one or more embodiments of the invention, multiple seeds may be used in lieu of the payment device number and one seed.

In Step 404, the payment application creates a data set with the payment device information and the seed. Specifically, the payment application may combine the payment device information and the seed to create the data set. For example, the payment application may concatenate, add, multiply, perform bitwise addition, exclusive OR (XOR), not OR (NOR) and/or other steps without departing from the scope of the invention. A number representing the current time frame may also be combined in the creation of the data set. Alternately, a nonce may be used instead of the actual time.

In Step 406, an encryption algorithm is applied to the data set in one or more embodiments of the invention. In one or more embodiments of the invention, the encryption is performed in tandem with, or as part of the combination of the numbers in Step 404. For example, the data set may only include the payment device information, and the data set is encrypted using the seed and time. For example, the encryption algorithm could be a cryptographic hash function, which takes the payment device information, the seed and a nonce as arguments. Alternatively, the data set includes the payment device information, seed, and time, and is encrypted as a whole by the encryption algorithm, using either no input, or variables external to the data set.

In Step 408, in one or more embodiments of the invention, the payment application uses a fractal generation algorithm to create a customer generated fractal image from the data set. Specifically, a fractal is generated using the fractal generation algorithm. From the fractal, the customer generated fractal image is generated by identifying values for particular points in the image using the generated fractal. In one or more embodiments of the invention, additional information is displayed in the same image. In one or more embodiments of the invention, such information may be separate from or overlaid on the fractal. For example, the information may be displayed as metadata hidden in the fractal. Such separate information might include the identity of the customer, reference/orientation points for a scanning device, or instructions for the central authority as to what payment device to use for the commercial transaction. The customer generated fractal image itself may store data in a variety of ways. For example, different embodiments of the invention might use the color, pattern, portion of the fractal image or level of zoom to convey different pieces of information. There are many possible fractal generation algorithms that might be used, and many possible variables that might be manipulated in each fractal generation algorithm to create a unique fractal image encoding payment information. In one or more embodiments of the information, the details and type of customer generated fractal image may be required to be varied depending on the scanning technology being used by the merchant.

In Step 410, the customer generated fractal image is displayed on the display of the customer mobile device. The customer generated fractal image is then scanned by the merchant point of sale device, and the scanned image is sent to the central authority to complete the transaction.

Figure 5:
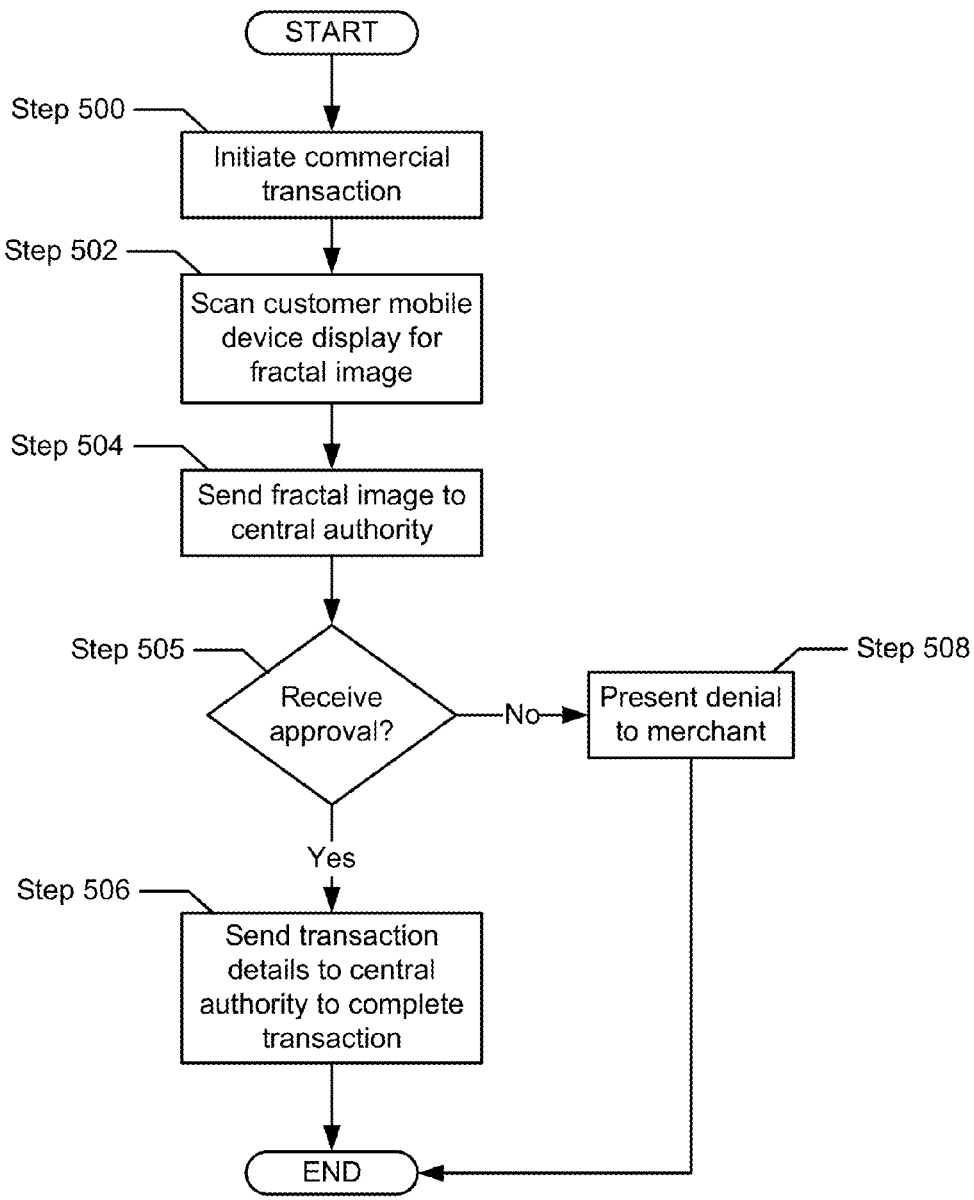

FIG. 5 shows a flowchart for operation of the fractal pay system from the perspective of the merchant point of sale device in accordance with one or more embodiments of the invention.

In Step 500, a commercial transaction is initiated on the merchant point of sale device. Initiating a commercial transaction may include scanning or entering the items or services being purchased into an application on the merchant point of sale device.

In Step 502, the merchant point of sale device scans the display of the customer mobile device. In one or more embodiments of the invention, the merchant point of sale device includes a camera which takes a picture of the customer mobile device. In one or more embodiments of the invention, the merchant point of sale device is configured to recognize when a fractal image can be processed and not scan the display until the customer generated fractal image is in focus, oriented properly and the detail can be fully resolved. In one or more embodiments of the invention, the customer generate fractal image includes markers to allow the scanner to determine the proper orientation.

In Step 504, the merchant point of sale device sends the scanned fractal image to the central authority. The image that is sent may be the image exactly as it was taken. Alternately, fractal image may be converted into a fully scanned digital form.

In Step 505, a determination is made whether an approval is received. Specifically, in one or more embodiments of the invention, after sending the image, the merchant point of sale device receives either an 'approved' or 'declined' message from the central authority. In one or more embodiments of the invention, the message may include an explanation for the fractal being declined or a request for additional detail.

In Step 506, the merchant point of sale device transmits the details of the transaction to the central authority so that the central authority can complete the transaction. In such embodiments, the merchant may receive confirmation that the financial transaction completed. Alternatively or additionally, as discussed above and in FIG. 3, the merchant may provide the transaction details to the central authority as part of Step 504. Alternatively or additionally, in one or more embodiments of the invention, the central authority sends payment device information to the merchant point of sale device so that the merchant and/or the merchant point of sale device can complete the transaction.

In Step 508, if the merchant point of sale device did not receive approval in Step 505, the merchant point of sale device presents a denial to the merchant. For example, the merchant point of sale device may have a timeout or the merchant point of sale device receives a 'declined' message from the central authority. In one or more embodiments of the invention, the 'declined' message specifies the reason the fractal image was declined and a course of action for the merchant to take. For example, if central authority could not resolve the image it may require the merchant to retake the picture. Alternately, if the time frame that the fractal was generated in had expired, it might instruct the merchant to have the customer regenerate the fractal. In such a scenario, the steps of FIG. 5 may be repeated to allow the customer or the merchant to regenerate and/or retake the fractal image.

Figure 6:
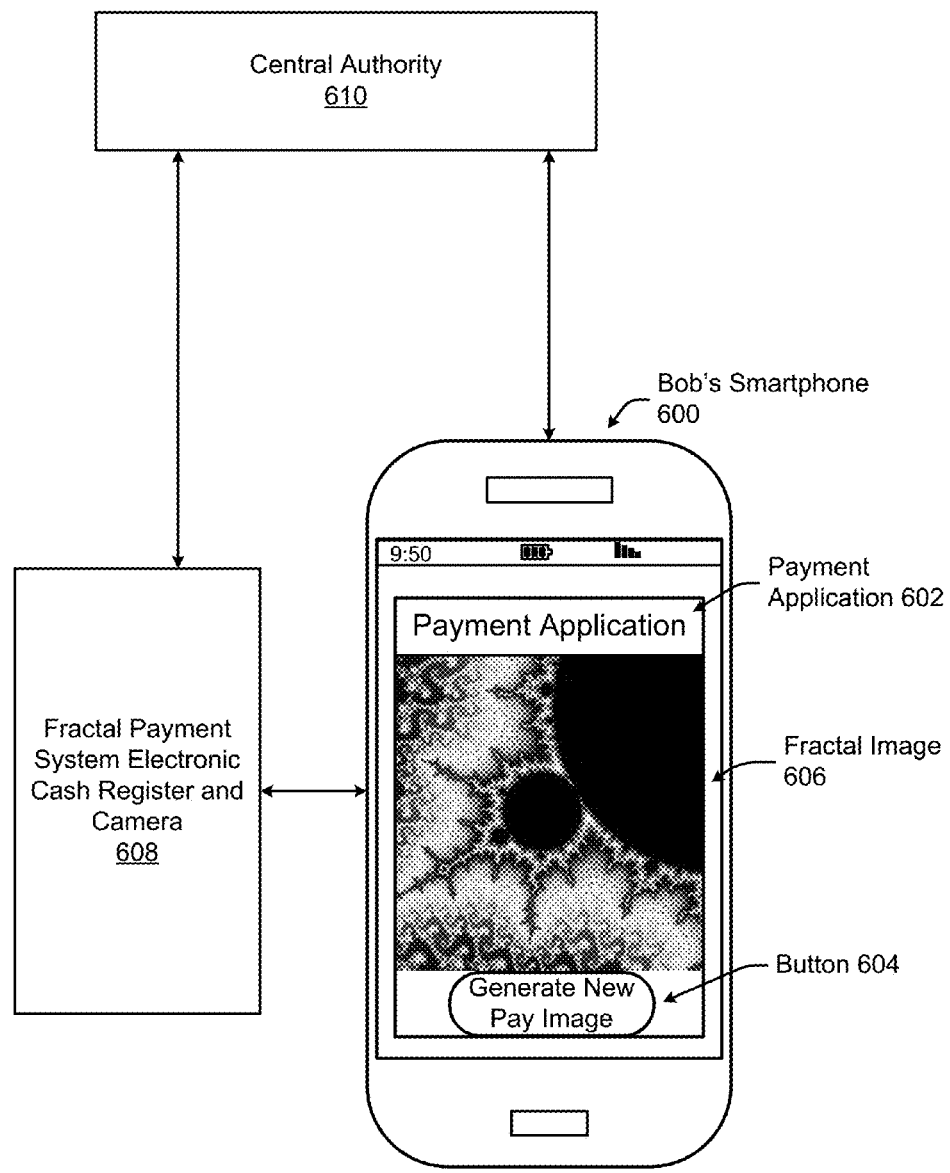
FIG. 6 shows an example of one or more embodiments of the invention.

FIG. 6 shows an example of the fractal pay system in operation. FIG. 6 and the example presented below are for explanatory purposes only and are not intended to limit the scope of the invention.

Customer Bob is paying for gas. After having his purchase added on the fractal pay system cash register by Gas Station Attendant Alice, Customer Bob takes out his smartphone (600) and opens the payment application (602). The payment application presents Customer Bob with button labeled 'Generate New Pay Image' (604). Customer Bob pushes the button (604). Customer Bob's smartphone (600) displays the fractal image (606). Customer Bob presents the fractal image (606) displayed on the smartphone (600) to Gas Station Attendant Alice, who readies a fractal pay system electronic cash register and camera (608) to scan Customer Bob's smartphone (600). Unbeknownst to the Gas Station Attendant Alice and Customer Bob, Nefarious Character Eve, who is standing in line behind Customer Bob, surreptitiously pulls out her camera phone, and photographs the fractal image (606) displayed on Customer Bob's smartphone (600) while Gas Station Attendant Alice is scanning it with the fractal pay system electronic cash register and camera (608). The scanned fractal image from Customer Bob's smartphone (600) is then sent by the fractal pay system electronic cash register and camera (608) over a secure connection to a central authority (610).

When the central authority (610) receives the scanned fractal image, the central authority performs a first level processing of the scanned fractal image to isolate the fractal in the scanned fractal image, and determine that the fractal image (610) claims to have been generated by Customer Bob's Smartphone (600). The central authority (610) also records the time at which the scanned fractal image was received. The central authority (608) then recovers a customer profile associated with Customer Bob from a data repository, and extracts payment device information belonging to Customer Bob, and a seed uniquely associated with Customer Bob. Using the seed, payment device information and the time at which the scanned fractal image was received, the central authority (608) determines that the fractal was indeed generated by Customer Bob, and was generated within the last one minute. The central authority (608) then sends a message to the fractal payment system electronic cash register and camera (608), indicating its approval of the scanned fractal image.

After receiving approval, the fractal payment system electronic cash register and camera (608) responds by sending the details of the transaction between Customer Bob and Gas Station Attendant Alice to the central authority (610). Upon receiving the transaction details, the central authority (610) recognizes that Customer Bob has purchased gas, and retrieves from the Customer Bob's profile on the data repository, the details of Customer Bob's gas station rewards credit card. The central authority (610) then retrieves from the data repository, a merchant profile for the gas station. Using the details of Customer Bob's gas station rewards credit card, the central authority (610) transfers money from the credit card account into a merchant account specified in the merchant profile of the gas station. Thus, the commercial transaction between Customer Bob and the gas station has been completed.

After Customer Bob has left the gas station, Nefarious Character Eve attempts to pay for gas by presenting the surreptitiously captured image of Customer Bob's fractal image to Gas Station Attendant Alice. However, when the central authority (610) attempts to verify the time frame in which the scanned fractal image was generated, the central authority (610) cannot, because the lifespan of the fractal image has lapsed. The central authority (610) the sends a message to the fractal payment system electronic cash register and camera (608), indicating the fractal image has been declined. Nefarious Character Eve has to pay for her own gas.

As shown by way of the example, one or more embodiments of the invention provide a secure system for the customer to pay for goods and/or services. Specifically, by not displaying the payment device information, a nefarious individual may not intercept the payment device information and use the information to make purchases using the payment device. What's more, if the nefarious individual does happen to obtain a copy of fractal image, the image will become invalid after a short period of time. Additionally, by having the payment application able to generate multiple fractal images or otherwise specify which payment device to use, the customer does not need to carry around multiple, or even a single, physical payment device in addition to the mobile device. Further, in embodiments in which the central authority receives the transaction details and does not provide the payment device information to the merchant, embodiments also protect the customer from nefarious merchants obtaining the payment device information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for approving a commercial transaction using a fractal image generated by a customer, comprising:
   receiving, from a central authority, a seed;
   receiving a request for the fractal image for payment of the commercial transaction with a merchant;
   obtaining a plurality of payment device information from a data repository on a mobile device;
   generating a fractal, using the seed and the plurality of payment device information;
   generating a two-dimensional gradient field using an approximation of the fractal;
   generating the fractal image using the two-dimensional gradient field;
   displaying the fractal image, and customer identity information viewable in a layer above the fractal image, on a display of the mobile device;
   scanning, by the merchant, the display to obtain a scanned fractal image and the customer identity information;
   sending, by the merchant, the scanned fractal image to the central authority; and
   approving, via the central authority, the commercial transaction by:
      generating an expected fractal using a copy of the plurality of payment device information and the seed, and
      comparing the scanned fractal image with the expected fractal.

2. The method of claim 1, wherein generating the fractal image comprises:
   concatenating a dataset and the seed to create a concatenated dataset;
   altering, using an algorithm, the concatenated dataset to create an altered dataset; and
   generating, using the altered dataset, the fractal image.

3. The method of claim 2, wherein the dataset is a payment device number.

4. The method of claim 2, wherein the algorithm is a cryptographic hash function.

5. The method of claim 2, wherein the algorithm uses a nonce as an input.

6. The method of claim 5, wherein the nonce is a time value.

7. The method of claim 2, wherein generating the expected fractal is performed identically to generating the fractal image.

8. A non-transitory computer readable medium comprising computer readable program code embodied therein for causing a computer system to pay for a commercial transaction using a fractal image generated by a customer by:
   receiving, from a central authority, a seed;
   receiving a request for a fractal image for payment of the commercial transaction with a merchant;
   obtaining a plurality of payment device information from a data repository on a mobile device;
   generating a fractal, using the seed and the plurality of payment device information;
   generating a two-dimensional gradient field using an approximation of the fractal;
   generating the fractal image using the two-dimensional gradient field; and
   displaying the fractal image, and customer identity information viewable in a layer above the fractal image, on a display of the mobile device;
   wherein the merchant scans the display to obtain a displayed fractal image and the customer identify information;
   wherein the merchant sends the scanned fractal image to the central authority; and
   wherein the commercial transaction is approved via the central authority by:
      generating an expected fractal using a copy of the plurality of payment device information and the seed, and
      comparing the scanned fractal image with the expected fractal.

9. The non-transitory computer readable medium of claim 8, wherein generating the fractal image comprises:
   concatenating a dataset and the seed to create a concatenated dataset;
   altering, using an algorithm, the concatenated dataset to create an altered dataset; and
   generating, using the altered dataset, the fractal image.

10. The non-transitory computer readable medium of claim 9, wherein the dataset is the plurality of payment device information, and wherein the algorithm takes as an input a time value.

* * * * *